US00RE42743E

(19) United States
(12) Reissued Patent
Master et al.

(10) Patent Number: US RE42,743 E
(45) Date of Reissued Patent: Sep. 27, 2011

(54) SYSTEM FOR AUTHORIZING FUNCTIONALITY IN ADAPTABLE HARDWARE DEVICES

(75) Inventors: Paul L. Master, Sunnyvale, CA (US); John Watson, Edgewood, WA (US)

(73) Assignee: QST Holdings, LLC, Palo Alto, CA (US)

(21) Appl. No.: 12/152,620

(22) Filed: May 15, 2008

Related U.S. Patent Documents

Reissue of:
(64) Patent No.: 7,046,635
Issued: May 16, 2006
Appl. No.: 09/998,006
Filed: Nov. 28, 2001

(51) Int. Cl.
*H04L 12/28* (2006.01)
*H04J 3/22* (2006.01)
*G06F 9/445* (2006.01)

(52) U.S. Cl. ..... 370/252; 370/419; 370/465; 717/168; 717/174

(58) Field of Classification Search ..... 370/241, 370/252, 419, 464–469; 717/168–178
See application file for complete search history.

(56) References Cited

U.S. PATENT DOCUMENTS 3,409,175 A 11/1968 Byrne
3,666,143 A 5/1972 Weston
3,938,639 A 2/1976 Birrell
3,949,903 A 4/1976 Benasutti et al.
3,960,298 A 6/1976 Birrell
3,967,062 A 6/1976 Dobias
3,991,911 A 11/1976 Shannon et al.
3,995,441 A 12/1976 McMillin
4,076,145 A 2/1978 Zygiel
4,143,793 A 3/1979 McMillin et al.
4,172,669 A 10/1979 Edelbach
4,174,872 A 11/1979 Fessler
4,181,242 A 1/1980 Zygiel et al.
RE30,301 E 6/1980 Zygiel
4,218,014 A 8/1980 Tracy
4,222,972 A 9/1980 Caldwell
4,237,536 A 12/1980 Enelow et al.
4,252,253 A 2/1981 Shannon
(Continued)

FOREIGN PATENT DOCUMENTS

DE 100 18 374 A1 10/2001
(Continued)

OTHER PUBLICATIONS

Abnous et al., "Ultra-Low-Power Domain-Specific Multimedia Processors," VLSI Signal Processing, IX, 1998, IEEE Workshop in San Francisco, CA, USA, Oct. 30-Nov. 1, 1998, pp. 461-470 (Oct. 30, 1998).

(Continued)

*Primary Examiner* — Kerri M Rose
(74) *Attorney, Agent, or Firm* — Nixon Peabody LLP

(57) ABSTRACT

A system for authorizing new or ongoing functional use of an adaptable device. The device generates usage information including the times that the device is used, types of functionality provided, indication of amount and type of resources used, and other information. The usage information is transmitted back to a controlling entity, such as an original manufacturer of the adaptable device. The controlling entity can act to enable or prevent use of the provided functionality, as desired. Part of the requirement for using functionality can be monetary, by predetermined agreement, or by other criteria.

21 Claims, 3 Drawing Sheets

U.S. PATENT DOCUMENTS

| | | | |
|---|---|---|---|
| 4,302,775 | A | 11/1981 | Widergren et al. |
| 4,333,587 | A | 6/1982 | Fessler et al. |
| 4,354,613 | A | 10/1982 | Desai et al. |
| 4,377,246 | A | 3/1983 | McMillin et al. |
| 4,393,468 | A | 7/1983 | New |
| 4,413,752 | A | 11/1983 | McMillin et al. |
| 4,458,584 | A | 7/1984 | Annese et al. |
| 4,466,342 | A | 8/1984 | Basile et al. |
| 4,475,448 | A | 10/1984 | Shoaf et al. |
| 4,509,690 | A | 4/1985 | Austin et al. |
| 4,520,950 | A | 6/1985 | Jeans |
| 4,549,675 | A | 10/1985 | Austin |
| 4,553,573 | A | 11/1985 | McGarrah |
| 4,560,089 | A | 12/1985 | McMillin et al. |
| 4,577,782 | A | 3/1986 | Fessler |
| 4,578,799 | A | 3/1986 | Scholl et al. |
| RE32,179 | E | 6/1986 | Sedam et al. |
| 4,633,386 | A | 12/1986 | Terepin et al. |
| 4,658,988 | A | 4/1987 | Hassell |
| 4,694,416 | A | 9/1987 | Wheeler et al. |
| 4,711,374 | A | 12/1987 | Gaunt et al. |
| 4,713,755 | A | 12/1987 | Worley, Jr. et al. |
| 4,719,056 | A | 1/1988 | Scott |
| 4,726,494 | A | 2/1988 | Scott |
| 4,747,516 | A | 5/1988 | Baker |
| 4,748,585 | A | 5/1988 | Chiarulli et al. |
| 4,760,525 | A | 7/1988 | Webb |
| 4,760,544 | A | 7/1988 | Lamb |
| 4,765,513 | A | 8/1988 | McMillin et al. |
| 4,766,548 | A | 8/1988 | Cedrone et al. |
| 4,781,309 | A | 11/1988 | Vogel |
| 4,800,492 | A | 1/1989 | Johnson et al. |
| 4,811,214 | A | 3/1989 | Nosenchuck et al. |
| 4,824,075 | A | 4/1989 | Holzboog |
| 4,827,426 | A | 5/1989 | Patton et al. |
| 4,850,269 | A | 7/1989 | Hancock et al. |
| 4,856,684 | A | 8/1989 | Gerstung |
| 4,901,887 | A | 2/1990 | Burton |
| 4,921,315 | A | 5/1990 | Metcalfe et al. |
| 4,930,666 | A | 6/1990 | Rudick |
| 4,932,564 | A | 6/1990 | Austin et al. |
| 4,936,488 | A | 6/1990 | Austin |
| 4,937,019 | A | 6/1990 | Scott |
| 4,960,261 | A | 10/1990 | Scott et al. |
| 4,961,533 | A | 10/1990 | Teller et al. |
| 4,967,340 | A | 10/1990 | Dawes |
| 4,974,643 | A | 12/1990 | Bennett et al. |
| 4,982,876 | A | 1/1991 | Scott |
| 4,993,604 | A | 2/1991 | Gaunt et al. |
| 5,007,560 | A | 4/1991 | Sassak |
| 5,021,947 | A | 6/1991 | Campbell et al. |
| 5,040,106 | A | 8/1991 | Maag |
| 5,044,171 | A | 9/1991 | Farkas |
| 5,090,015 | A | 2/1992 | Dabbish et al. |
| 5,129,549 | A | 7/1992 | Austin |
| 5,139,708 | A | 8/1992 | Scott |
| 5,156,301 | A | 10/1992 | Hassell et al. |
| 5,156,871 | A | 10/1992 | Goulet et al. |
| 5,165,575 | A | 11/1992 | Scott |
| 5,190,083 | A | 3/1993 | Gupta et al. |
| 5,190,189 | A | 3/1993 | Zimmer et al. |
| 5,193,151 | A | 3/1993 | Jain |
| 5,193,718 | A | 3/1993 | Hassell et al. |
| 5,202,993 | A | 4/1993 | Tarsy et al. |
| 5,203,474 | A | 4/1993 | Haynes |
| 5,240,144 | A | 8/1993 | Feldman |
| 5,261,099 | A | 11/1993 | Bigo et al. |
| 5,263,509 | A | 11/1993 | Cherry et al. |
| 5,269,442 | A | 12/1993 | Vogel |
| 5,280,711 | A | 1/1994 | Motta et al. |
| 5,297,400 | A | 3/1994 | Benton et al. |
| 5,301,100 | A | 4/1994 | Wagner |
| 5,303,846 | A | 4/1994 | Shannon |
| 5,335,276 | A | 8/1994 | Thompson et al. |
| 5,339,428 | A | 8/1994 | Burmeister et al. |
| 5,343,716 | A | 9/1994 | Swanson et al. |
| 5,361,362 | A | 11/1994 | Benkeser et al. |
| 5,368,198 | A | 11/1994 | Goulet |
| 5,379,343 | A | 1/1995 | Grube et al. |
| 5,381,546 | A | 1/1995 | Servi et al. |
| 5,381,550 | A | 1/1995 | Jourdenais et al. |
| 5,388,212 | A | 2/1995 | Grube et al. |
| 5,392,960 | A | 2/1995 | Kendt et al. |
| 5,437,395 | A | 8/1995 | Bull et al. |
| 5,450,557 | A | 9/1995 | Kopp et al. |
| 5,454,406 | A | 10/1995 | Rejret et al. |
| 5,465,368 | A | 11/1995 | Davidson et al. |
| 5,479,055 | A | 12/1995 | Eccles |
| 5,490,165 | A | 2/1996 | Blakeney, II et al. |
| 5,491,823 | A | 2/1996 | Ruttenberg |
| 5,507,009 | A | 4/1996 | Grube et al. |
| 5,515,519 | A | 5/1996 | Yoshioka et al. |
| 5,517,600 | A | 5/1996 | Shimokawa |
| 5,519,694 | A | 5/1996 | Brewer et al. |
| 5,522,070 | A | 5/1996 | Sumimoto |
| 5,530,964 | A | 6/1996 | Alpert et al. |
| 5,534,796 | A | 7/1996 | Edwards |
| 5,542,265 | A | 8/1996 | Rutland |
| 5,553,755 | A | 9/1996 | Bonewald et al. |
| 5,555,417 | A | 9/1996 | Odnert et al. |
| 5,560,028 | A | 9/1996 | Sachs et al. |
| 5,560,038 | A | 9/1996 | Haddock |
| 5,570,587 | A | 11/1996 | Kim |
| 5,572,572 | A | 11/1996 | Kawan et al. |
| 5,590,353 | A | 12/1996 | Sakakibara et al. |
| 5,594,657 | A | 1/1997 | Cantone et al. |
| 5,600,810 | A | 2/1997 | Ohkami |
| 5,600,844 | A | 2/1997 | Shaw et al. |
| 5,602,833 | A | 2/1997 | Zehavi |
| 5,603,043 | A | 2/1997 | Taylor et al. |
| 5,607,083 | A | 3/1997 | Vogel et al. |
| 5,608,643 | A | 3/1997 | Wichter et al. |
| 5,611,867 | A | 3/1997 | Cooper et al. |
| 5,623,545 | A | 4/1997 | Childs et al. |
| 5,625,669 | A | 4/1997 | McGregor et al. |
| 5,626,407 | A | 5/1997 | Westcott |
| 5,630,206 | A | 5/1997 | Urban et al. |
| 5,635,940 | A | 6/1997 | Hickman et al. |
| 5,646,544 | A | 7/1997 | Iadanza |
| 5,646,545 | A | 7/1997 | Trimberger et al. |
| 5,647,512 | A | 7/1997 | Assis Mascarenhas deOliveira et al. |
| 5,649,187 | A * | 7/1997 | Hornbuckle ..... 709/224 |
| 5,667,110 | A | 9/1997 | McCann et al. |
| 5,684,793 | A | 11/1997 | Kiema et al. |
| 5,684,980 | A | 11/1997 | Casselman |
| 5,687,236 | A | 11/1997 | Moskowitz et al. |
| 5,694,613 | A | 12/1997 | Suzuki |
| 5,694,794 | A | 12/1997 | Jerg et al. |
| 5,699,328 | A | 12/1997 | Ishizaki et al. |
| 5,701,482 | A | 12/1997 | Harrison et al. |
| 5,704,053 | A | 12/1997 | Santhanam |
| 5,706,191 | A | 1/1998 | Bassett et al. |
| 5,706,976 | A | 1/1998 | Purkey |
| 5,712,996 | A | 1/1998 | Schepers |
| 5,720,002 | A | 2/1998 | Wang |
| 5,721,693 | A | 2/1998 | Song |
| 5,721,854 | A | 2/1998 | Ebicioglu et al. |
| 5,732,563 | A | 3/1998 | Bethuy et al. |
| 5,734,808 | A | 3/1998 | Takeda |
| 5,737,631 | A | 4/1998 | Trimberger |
| 5,742,180 | A | 4/1998 | DeHon et al. |
| 5,742,821 | A | 4/1998 | Prasanna |
| 5,745,366 | A | 4/1998 | Highma et al. |
| RE35,780 | E | 5/1998 | Hassell et al. |
| 5,751,295 | A | 5/1998 | Becklund et al. |
| 5,754,227 | A | 5/1998 | Fukuoka |
| 5,758,261 | A | 5/1998 | Wiedeman |
| 5,768,561 | A | 6/1998 | Wise |
| 5,778,439 | A | 7/1998 | Trimberger et al. |
| 5,784,636 | A | 7/1998 | Rupp |
| 5,787,237 | A | 7/1998 | Reilly |
| 5,790,817 | A | 8/1998 | Asghar et al. |
| 5,791,517 | A | 8/1998 | Avital |
| 5,791,523 | A | 8/1998 | Oh |
| 5,794,062 | A | 8/1998 | Baxter |
| 5,794,067 | A | 8/1998 | Kadowaki |

5,802,055 A 9/1998 Krein et al.
5,818,603 A 10/1998 Motoyama
5,822,308 A 10/1998 Weigand et al.
5,822,313 A 10/1998 Malek et al.
5,822,360 A 10/1998 Lee et al.
5,828,858 A 10/1998 Athanas et al.
5,829,085 A 11/1998 Jerg et al.
5,835,753 A 11/1998 Witt
5,838,165 A 11/1998 Chatter
5,845,815 A 12/1998 Vogel
5,860,021 A 1/1999 Klingman
5,862,961 A 1/1999 Motta et al.
5,870,427 A 2/1999 Tiedemann, Jr. et al.
5,873,045 A 2/1999 Lee et al.
5,881,106 A 3/1999 Cartier
5,884,284 A 3/1999 Peters et al.
5,886,537 A 3/1999 Macias et al.
5,887,174 A 3/1999 Simons et al.
5,889,816 A 3/1999 Agrawal et al.
5,890,014 A 3/1999 Long
5,892,900 A 4/1999 Ginter et al.
5,892,961 A 4/1999 Trimberger
5,894,473 A 4/1999 Dent
5,901,884 A 5/1999 Goulet et al.
5,903,886 A 5/1999 Heimlich et al.
5,907,285 A 5/1999 Toms et al.
5,907,580 A 5/1999 Cummings
5,910,733 A 6/1999 Bertolet et al.
5,912,572 A 6/1999 Graf, III
5,913,172 A 6/1999 McCabe et al.
5,917,852 A 6/1999 Butterfield et al.
5,920,801 A 7/1999 Thomas et al.
5,931,918 A 8/1999 Row et al.
5,933,642 A 8/1999 Greenbaum et al.
5,940,438 A 8/1999 Poon et al.
5,949,415 A 9/1999 Lin et al.
5,950,011 A 9/1999 Albrecht et al.
5,950,131 A 9/1999 Vilmur
5,951,674 A 9/1999 Moreno
5,953,322 A 9/1999 Kimball
5,956,518 A 9/1999 DeHon et al.
5,956,967 A 9/1999 Kim
5,959,811 A 9/1999 Richardson
5,959,881 A 9/1999 Trimberger et al.
5,963,048 A 10/1999 Harrison et al.
5,966,534 A 10/1999 Cooke et al.
5,970,254 A 10/1999 Cooke et al.
5,987,105 A 11/1999 Jenkins et al.
5,987,611 A 11/1999 Freund
5,991,302 A 11/1999 Berl et al.
5,991,308 A 11/1999 Fuhrmann et al.
5,993,739 A 11/1999 Lyon
5,999,734 A 12/1999 Willis et al.
6,005,943 A 12/1999 Cohen et al.
6,006,105 A * 12/1999 Rostoker et al. ..... 455/552.1
6,006,249 A 12/1999 Leong
6,016,395 A 1/2000 Mohamed
6,021,186 A 2/2000 Suzuki et al.
6,021,492 A 2/2000 May
6,023,742 A 2/2000 Ebeling et al.
6,023,755 A 2/2000 Casselman
6,028,610 A 2/2000 Deering
6,036,166 A 3/2000 Olson
6,039,219 A 3/2000 Bach et al.
6,041,322 A 3/2000 Meng et al.
6,041,970 A 3/2000 Vogel
6,046,603 A 4/2000 New
6,047,115 A 4/2000 Mohan et al.
6,052,600 A 4/2000 Fette et al.
6,055,314 A 4/2000 Spies et al.
6,056,194 A 5/2000 Kolls
6,059,840 A 5/2000 Click, Jr.
6,061,580 A 5/2000 Altschul et al.
6,073,132 A 6/2000 Gehman
6,076,174 A 6/2000 Freund
6,078,736 A 6/2000 Guccione
6,085,740 A 7/2000 Ivri et al.
6,088,043 A 7/2000 Kelleher et al.
6,091,263 A 7/2000 New et al.
6,091,765 A 7/2000 Pietzold, III et al.
6,094,065 A 7/2000 Tavana et al.
6,094,726 A 7/2000 Gonion et al.
6,111,893 A 8/2000 Volftsun et al.
6,111,935 A 8/2000 Hughes-Hartogs
6,115,751 A 9/2000 Tam et al.
6,120,551 A 9/2000 Law et al.
6,122,670 A 9/2000 Bennett et al.
6,138,693 A 10/2000 Matz
6,141,283 A 10/2000 Bogin et al.
6,150,838 A 11/2000 Wittig et al.
6,154,494 A 11/2000 Sugahara et al.
6,157,997 A 12/2000 Oowaki et al.
6,175,854 B1 1/2001 Bretscher
6,175,892 B1 1/2001 Sazzad et al.
6,181,981 B1 1/2001 Varga et al.
6,185,418 B1 2/2001 MacLellan et al.
6,192,070 B1 2/2001 Poon et al.
6,192,255 B1 2/2001 Lewis et al.
6,192,388 B1 2/2001 Cajolet
6,195,788 B1 2/2001 Leaver et al.
6,198,924 B1 3/2001 Ishii et al.
6,199,181 B1 3/2001 Rechef et al.
6,202,130 B1 3/2001 Scales, III et al.
6,219,697 B1 4/2001 Lawande et al.
6,219,756 B1 4/2001 Kasamizugami
6,219,780 B1 4/2001 Lipasti
6,223,222 B1 4/2001 Fijolek et al.
6,226,364 B1 * 5/2001 O'Neil ..... 379/114.2
6,226,387 B1 5/2001 Tewfik et al.
6,230,307 B1 5/2001 Davis et al.
6,237,029 B1 5/2001 Master et al.
6,246,883 B1 6/2001 Lee
6,247,125 B1 6/2001 Noel-Baron et al.
6,249,251 B1 6/2001 Chang et al.
6,258,725 B1 7/2001 Lee et al.
6,263,057 B1 7/2001 Silverman
6,266,760 B1 7/2001 DeHon et al.
6,272,579 B1 8/2001 Lentz et al.
6,281,703 B1 8/2001 Furuta et al.
6,282,627 B1 8/2001 Wong et al.
6,289,375 B1 9/2001 Knight et al.
6,289,434 B1 9/2001 Roy
6,289,488 B1 9/2001 Dave et al.
6,292,822 B1 9/2001 Hardwick
6,292,827 B1 9/2001 Raz
6,292,830 B1 9/2001 Taylor et al.
6,301,653 B1 10/2001 Mohamed et al.
6,305,014 B1 10/2001 Roediger et al.
6,311,149 B1 10/2001 Ryan et al.
6,321,985 B1 11/2001 Kolls
6,346,824 B1 2/2002 New
6,347,346 B1 2/2002 Taylor
6,349,394 B1 2/2002 Brock et al.
6,353,841 B1 3/2002 Marshall et al.
6,356,994 B1 3/2002 Barry et al.
6,359,248 B1 3/2002 Mardi
6,360,256 B1 3/2002 Lim
6,360,259 B1 3/2002 Bradley
6,360,263 B1 3/2002 Kurtzberg et al.
6,363,411 B1 3/2002 Dugan et al.
6,366,999 B1 4/2002 Drabenstott et al.
6,377,983 B1 4/2002 Cohen et al.
6,378,072 B1 4/2002 Collins et al.
6,381,735 B1 4/2002 Hunt
6,385,751 B1 5/2002 Wolf
6,405,214 B1 6/2002 Meade, II
6,408,039 B1 6/2002 Ito
6,410,941 B1 6/2002 Taylor et al.
6,411,612 B1 6/2002 Halford et al.
6,421,372 B1 7/2002 Bierly et al.
6,421,809 B1 7/2002 Wuytack et al.
6,430,624 B1 8/2002 Jamtgaard et al.
6,433,578 B1 8/2002 Wasson
6,434,590 B1 8/2002 Blelloch et al.
6,438,737 B1 8/2002 Morelli et al.
6,456,996 B1 9/2002 Crawford, Jr. et al.
6,459,883 B2 10/2002 Subramanian et al.
6,473,609 B1 10/2002 Schwartz et al.

6,507,947 B1 1/2003 Schreiber et al.
6,510,138 B1 1/2003 Pannell
6,510,510 B1 1/2003 Garde
6,538,470 B1 3/2003 Langhammer et al.
6,556,044 B2 4/2003 Langhammer et al.
6,563,891 B1 5/2003 Eriksson et al.
6,570,877 B1 5/2003 Kloth et al.
6,577,678 B2 6/2003 Scheuermann
6,587,684 B1 7/2003 Hsu et al.
6,590,415 B2 7/2003 Agrawal et al.
6,601,086 B1 7/2003 Howard et al.
6,601,158 B1 7/2003 Abbott et al.
6,604,085 B1 8/2003 Kolls
6,606,529 B1 8/2003 Crowder, Jr. et al.
6,615,333 B1 9/2003 Hoogerbrugge et al.
6,618,434 B2 9/2003 Heidari-Bateni et al.
6,640,304 B2 10/2003 Ginter et al.
6,653,859 B2 11/2003 Sihlbom et al.
6,675,265 B2 1/2004 Barroso et al.
6,691,148 B1 2/2004 Zinky et al.
6,711,617 B1 3/2004 Bantz et al.
6,718,182 B1 4/2004 Kung
6,721,286 B1 4/2004 Williams et al.
6,721,884 B1 4/2004 De Oliveira Kastrup Pereira et al.
6,732,354 B2 5/2004 Ebeling et al.
6,735,621 B1 5/2004 Yoakum et al.
6,738,744 B2 5/2004 Kirovski et al.
6,748,360 B2 6/2004 Pitman et al.
6,754,470 B2 6/2004 Hendrickson et al.
6,760,587 B2 7/2004 Holtzman et al.
6,766,165 B2 7/2004 Sharma et al.
6,778,212 B1 8/2004 Deng et al.
6,785,341 B2 8/2004 Walton et al.
6,819,140 B2 11/2004 Yamanaka et al.
6,823,448 B2 11/2004 Roth et al.
6,829,633 B2 12/2004 Gelfer et al.
6,832,250 B1 12/2004 Coons et al.
6,836,839 B2 12/2004 Master et al.
6,865,664 B2 3/2005 Budrovic et al.
6,871,236 B2 3/2005 Fishman et al.
6,883,084 B1 4/2005 Donohoe
6,894,996 B2 5/2005 Lee
6,901,440 B1 5/2005 Bimm et al.
6,912,515 B2 6/2005 Jackson et al.
6,985,517 B2 1/2006 Matsumoto et al.
6,986,021 B2 1/2006 Master et al.
6,988,139 B1 1/2006 Jervis et al.
7,032,229 B1 4/2006 Flores et al.
7,044,741 B2 5/2006 Leem
7,080,051 B1 * 7/2006 Crawford ..... 709/219
7,082,456 B2 7/2006 Mani-Meitav et al.
7,139,910 B1 11/2006 Ainsworth et al.
7,142,731 B1 11/2006 Toi
7,249,242 B2 7/2007 Ramchandran
7,536,686 B2 * 5/2009 Tan et al. ..... 717/174
2001/0003191 A1 6/2001 Kovacs et al.
2001/0023482 A1 9/2001 Wray
2001/0029515 A1 10/2001 Mirsky
2001/0034795 A1 10/2001 Moulton et al.
2001/0039654 A1 11/2001 Miyamoto
2001/0048713 A1 12/2001 Medlock et al.
2001/0048714 A1 12/2001 Jha
2001/0050948 A1 12/2001 Ramberg et al.
2002/0010848 A1 1/2002 Kamano et al.
2002/0013799 A1 1/2002 Blaker
2002/0013937 A1 1/2002 Ostanevich et al.
2002/0015435 A1 2/2002 Rieken
2002/0015439 A1 2/2002 Kohli et al.
2002/0023210 A1 2/2002 Tuomenoksa et al.
2002/0024942 A1 2/2002 Tsuneki et al.
2002/0024993 A1 2/2002 Subramanian et al.
2002/0031166 A1 3/2002 Subramanian et al.
2002/0032551 A1 3/2002 Zakiya
2002/0035623 A1 3/2002 Lawande et al.
2002/0041581 A1 4/2002 Aramaki
2002/0042907 A1 4/2002 Yamanaka et al.
2002/0061741 A1 5/2002 Leung et al.
2002/0069282 A1 6/2002 Reisman
2002/0072830 A1 6/2002 Hunt
2002/0078337 A1 6/2002 Moreau et al.
2002/0083305 A1 6/2002 Renard et al.
2002/0083423 A1 6/2002 Ostanevich et al.
2002/0087829 A1 7/2002 Snyder et al.
2002/0089348 A1 7/2002 Langhammer
2002/0101909 A1 8/2002 Chen et al.
2002/0107905 A1 8/2002 Roe et al.
2002/0107962 A1 8/2002 Richter et al.
2002/0119803 A1 8/2002 Bitterlich et al.
2002/0120672 A1 8/2002 Butt et al.
2002/0138716 A1 9/2002 Master et al.
2002/0141489 A1 10/2002 Imaizumi
2002/0147845 A1 10/2002 Sanchez-Herrero et al.
2002/0159503 A1 10/2002 Ramachandran
2002/0162026 A1 10/2002 Neuman et al.
2002/0168018 A1 11/2002 Scheuermann
2002/0181559 A1 12/2002 Heidari-Bateni et al.
2002/0184291 A1 12/2002 Hogenauer
2002/0184498 A1 12/2002 Qi
2002/0191790 A1 12/2002 Anand et al.
2003/0007606 A1 1/2003 Suder et al.
2003/0012270 A1 1/2003 Zhou et al.
2003/0018446 A1 1/2003 Makowski et al.
2003/0018700 A1 1/2003 Giroti et al.
2003/0023830 A1 1/2003 Hogenauer
2003/0026242 A1 2/2003 Jokinen et al.
2003/0030004 A1 2/2003 Dixon et al.
2003/0046421 A1 3/2003 Horvitz et al.
2003/0061260 A1 3/2003 Rajkumar
2003/0061311 A1 3/2003 Lo
2003/0063656 A1 4/2003 Rao et al.
2003/0066063 A1 * 4/2003 Yokota ..... 717/173
2003/0076815 A1 4/2003 Miller et al.
2003/0099223 A1 5/2003 Chang et al.
2003/0102889 A1 6/2003 Master et al.
2003/0105949 A1 6/2003 Master et al.
2003/0110485 A1 6/2003 Lu et al.
2003/0142818 A1 7/2003 Raghunathan et al.
2003/0154357 A1 8/2003 Master et al.
2003/0163723 A1 8/2003 Kozuch et al.
2003/0172138 A1 9/2003 McCormack et al.
2003/0172139 A1 9/2003 Srinivasan et al.
2003/0200538 A1 10/2003 Ebeling et al.
2003/0212684 A1 11/2003 Meyer et al.
2004/0006584 A1 1/2004 Vandeweerd
2004/0010645 A1 1/2004 Scheuermann et al.
2004/0015970 A1 1/2004 Scheuermann
2004/0025159 A1 2/2004 Scheuermann et al.
2004/0057505 A1 3/2004 Valio
2004/0062300 A1 4/2004 McDonough et al.
2004/0081248 A1 4/2004 Parolari
2004/0093479 A1 5/2004 Ramchandran
2004/0168044 A1 8/2004 Ramchandran
2005/0166038 A1 7/2005 Wang et al.
2005/0198199 A1 * 9/2005 Dowling ..... 709/217
2006/0031660 A1 2/2006 Master et al.

FOREIGN PATENT DOCUMENTS

EP 0 301 169 A1 2/1989
EP 0 166 586 B1 1/1991
EP 0 236 633 B1 5/1991
EP 0 478 624 B1 4/1992
EP 0 479 102 A2 4/1992
EP 0 661 831 A2 7/1995
EP 0 668 659 A2 8/1995
EP 0 690 588 A2 1/1996
EP 0 691 754 A2 1/1996
EP 0 768 602 A2 4/1997
EP 0 817 003 A2 1/1998
EP 0 821 495 A2 1/1998
EP 0 866 210 A2 9/1998
EP 0 923 247 A2 6/1999
EP 0 926 596 A2 6/1999
EP 1 056 217 A2 11/2000
EP 1 061 437 A1 12/2000
EP 1 061 443 A2 12/2000
EP 1 126 368 A2 8/2001
EP 1 150 506 A2 10/2001
EP 1 189 358 A1 3/2002

| | | | |
|---|---|---|---|
| GB | 2 067 800 | A | 7/1981 |
| GB | 2 237 908 | A | 5/1991 |
| JP | 62-249456 | | 10/1987 |
| JP | 63-147258 | | 6/1988 |
| JP | 4-51546 | | 2/1992 |
| JP | 7-064789 | | 3/1995 |
| JP | 7066718 | | 3/1995 |
| JP | 10233676 | | 9/1998 |
| JP | 10254696 | | 9/1998 |
| JP | 11296345 | | 10/1999 |
| JP | 2000315731 | | 11/2000 |
| JP | 2001-053703 | | 2/2001 |
| WO | WO 89/05029 | A1 | 6/1989 |
| WO | WO 89/11443 | A2 | 11/1989 |
| WO | WO 91/00238 | A1 | 1/1991 |
| WO | WO 93/13603 | A1 | 7/1993 |
| WO | WO 95/11855 | A1 | 5/1995 |
| WO | WO 96/33558 | A1 | 10/1996 |
| WO | WO 98/32071 | A3 | 7/1998 |
| WO | WO 99/03776 | A1 | 1/1999 |
| WO | WO 99/21094 | A2 | 4/1999 |
| WO | WO 99/26860 | A1 | 6/1999 |
| WO | WO 99/65818 | A1 | 12/1999 |
| WO | WO 00/19311 | A1 | 4/2000 |
| WO | WO 00/65855 | A1 | 11/2000 |
| WO | WO 00/69073 | A1 | 11/2000 |
| WO | WO 01/11281 | A1 | 2/2001 |
| WO | WO 01/22235 | A1 | 3/2001 |
| WO | WO 01/76129 | A2 | 10/2001 |
| WO | WO 02/12978 | A2 | 2/2002 |

OTHER PUBLICATIONS

Aggarwal et al.., "Efficient Huffman Decoding," International Conference on Image Processing IEEE 1:936-939 (Sep. 10-13, 2000).
Allan et al., "Software Pipelining," ACM Computing Surveys, 27(3):1-78 (Sep. 1995).
Alsolaim et al., "Architecture and Application of a Dynamically Reconfigurable Hardware Array for Future Mobile Communication Systems," Field Programmable Custom Computing Machines, 2000 IEEE Symposium, Napa Valley, Los Alamitos, CA. IEEE Comput. Soc. pp. 205-214 (Apr. 17-19, 2000).
Ashenden et al., "The VHDL Cookbook," Dept. Computer Science, University of Adelaide, South Australia. Downloaded from http://tams-www.informatik.uni-hamburg.de/vhdl/doc/cookbook/VHDL-Cookbook.pdf on Dec. 7, 2006 (Jul. 1990).
Bacon et al., "Compiler Transformations for High-Performance Computing," ACM Computing Surveys 26(4):368-373 (Dec. 1994).
Balasubramonian et al., "Reducing the Complexity of the Register File in Dynamic Superscalar Processors," Proceedings of the 34th Annual ACM/IEEE International Symposium on Microarchitecture, pp. 237-248 (Dec. 1, 2001).
Banerjee et al., "A MATLAB Compiler for Distributed, Heterogeneous, Reconfigurable Computing Systems," 2000 IEEE Symposium, pp. 39-48, (Apr. 17-19, 2000).
Bapte et al., "Uniform Execution Environment for Dynamic Reconfiguration," Darpa Adaptive Computing Systems, http://isis.vanderbilt.edu/publications/archive/babty_T_#_0_1999_Uniform_Ex.pdf, pp. 1-7 (1999).
Baumgarte et al., "PACT XPP—A Self-Reconfigurable Data Processing Architecture," NN www.pactcorp.com/sneu/download/ersa01.pdf; retrieved on Nov. 25, 2005 (Jun. 25, 2001).
Becker et al., "An Application-Tailored Dynamically Reconfigurable Hardware Architecture for Digital Baseband Processing," IEEE Conference Proceedings Article pp. 341-346 (Sep. 18, 2000).
Becker et al., "Design and Implementation of a Coarse-Grained Dynamically Reconfigurable Hardware Architecture," VLSI 2001, Proceedings IEEE Computer Soc. Workshop, Piscataway, NJ, USA, pp. 41-46 (Apr. 19-20, 2001).
Bevstar, BevStar Bottled Water Model Advertisement *Automatic Merchandiser* at www.AMonline.com (2005).
Bevstar, BevStar Point of Use Water Model Advertisement *Automatic Merchandiser* at www.AMonline.com (2005).
Bishop & Loucks, "A Heterogeneous Environment for Hardware/Software Cosimulation," Proceedings of the 30th Annual Simulation Symposium, pp. 14-22 (Apr. 7-9, 1997).
Brakensiek et al., "Re-Configurable Multi-Standard Terminal for Heterogeneous Networks," Radio and Wireless Conference, Rawcon 2002 IEEE. pp. 27-30 (2002).
Brown et al., "Quick PDA Data Exchange," PC Magazine pp. 1-3 (May 22, 2001).
Buck et al., "Ptolemy: A Framework for Simulating and Prototyping Heterogeneous Systems," International Journal of Computer Simulation 4:155-182 (Apr. 1994).
Burns et al., "A Dynamic Reconfiguration Run-Time System," Proceedings of the 5th Annual Symposium on Field-Programmable Custom Computing Machines, pp. 166-175 (Apr. 16, 1997).
Business Wire, "Whirlpool Internet-Enabled Appliances to Use Beeline Shopper Software Features," http://www.whirlpoocorp.com/news/releases/release.asp?rid=90 (Feb. 16, 2001).
Buttazzo et al., "Optimal Deadline Assignment for Scheduling Soft Aperiodic Tasks in Hard Real-Time Environments," Engineering of Complex Computer Systems, Proceedings of the Third IEEE International Conference on Como, pp. 39-48 (Sep. 8, 1997).
Callahan et al., "Adapting Software Pipelining for Reconfigurable Computing," in Proceedings of the International Conference on Compilers, Architectrue and Synthesis for Embedded Systems p. 8, ACM (Cases '00, San Jose, CA) (Nov. 17-18, 2000).
Chapman & Mehrotra, "OpenMP and HPF: Integrating Two Paradigms," Proceedings of the 4th International Euro-Par Conference (Euro-Par'98), Springer-Verlag Heidelberg, Lecture Notes in Computer Science 1470:650-658 (1998).
Chen et al., "A Reconfigurable Multiprocessor IC for Rapid Prototyping of Algorithmic-Specific High-Speed DSP Data Paths," IEEE Journal of Solid-State Circuits, IEEE 35:74-75 (Feb. 1, 2001).
Clarke, "Embedded Solutions Enters Development Pact with Marconi," EETimes Online (Jan. 26, 2000).
Compton & Hauck, "Reconfigurable Computing: A Survey of Systems and Software," ACM Press, ACM Computing Surveys (CSUR) 34(2)171-210 (Jun. 2002).
Compton et al., "Configuration Relocation and Defragmentation for Run-Time Reconfigurable Computing," Northwestern University, http://citeseer.nj.nec.com/compton00configuration.html, pp. 1-17 (2000).
Conte et al., "Dynamic Rescheduling. A Technique for Object Code Compatibility in VLIW Architectures," Proceedings of the 28th Annulal International Symposium on Microarchitecture pp. 208-218 (Nov. 29, 1995).
Conte et al., "Instruction Fetch Mechanisms for VLIW Architectures with Compressed Encodings," Proceedings of the Annual IEEE/ACM International Symposium on Microarchitecture (Micro) 29:201-211 (Dec. 2, 1996).
Cray Research Inc., "Cray T3E Fortran Optimization Guide," Ver. 004-2518-002, Section 4.5 (Jan. 1999).
Cummings et al., "FPGA in the Software Radio," IEEE Communications Magazine . 37(2):108-112 (Feb. 1999).
Dandalis et al., "An Adaptive Cryptograhic Engine for IPSec Architectures," IEEE pp. 132-141 (Jan. 2000).
David et al., "DART: A Dynamically Reconfigurable Architecture Dealing with Future Mobile Telecommunication Constraints," Proceedings of the International Parallel and Distributed Processing Symposium pp. 156-163 (Apr. 15, 2002).
Deepakumara et al., "FPGA Implementation of MD5 has Algorithm," Canadian Conference on Electrical and Computer Engineering, IEEE (2001).
Dehon et al., "Reconfigurable Computing: What, Why and Implications for Design Automation," Design Automation Conference Proceedings pp. 610-615 (1999).
Dipert, "Figuring Out Reconfigurable Logic," EDN 44(16):107-114 (Aug. 5, 1999).
Dominikus, "A Hardware Implementation of MD4-Family Hash Algorithms," 9th International Conference on Electronics, Circuits and Systems IEEE (2002).
Dorband, "aCe C Language Reference Guide," Online (Archived Mar. 2001), http://web.archive.org/web/20000616053819/http://newton.gsfc.nasa.gov/aCe/aCe_dir/aCe_cc_Ref.html (Mar. 2001).
Drozdowski, "Scheduling Multiprocessor Tasks—An Overview," Instytut Informatyki Politechnika, pp. 1-31 (Jan. 31, 1996).

Ebeling et al., "RaPiD Reconfigurable Pipelined Datapath," Springer-Verlag, 6th International Workshop on Field-Programmable Logic and Applications pp. 126-135 (1996).
Fawer et al., "A Multiprocessor Approach for Implementing a Time-Diversity Spread Specturm Receiver," Proceeding sof the 1990 International Zurich Seminal on Digital Communications, pp. 173-180 (Mar. 5-8, 1990).
Fisher, "Gone Flat," Forbes pp. 76-79 (Oct. 2001).
Fleischmann et al., "Prototyping Networked Embedded Systems," Integrated Engineering, pp. 116-119 (Feb. 1999).
Forbes "Best of the Web—Computer Networking/Consumer Durables," *The Forbes Magnetic 40* p. 80 (May 2001).
Gibson, "Fresh Technologies Will Create Myriad Functions," FT Information Technology Review; World Wide Web at http://technews.acm.org/articles/2000-2/0301w.
html?searchterm=%22fresh+technologies%22 (Mar. 1, 2000).
Gluth, "Integrierte Signalprozessoren," Elektronik 35(18):112-118 Franzis Verlag GmbH, Munich, Germany (Sep. 5, 1986).
Gokhale & Schlesinger, "A Data Parallel C and Its Platforms," Proceedings of the Fifth Symposium on the Frontiers of Massively Parallel Computation pp. 194-202 (Frontiers '95) (Feb. 1995).
Grimm et al., "A System Architecture for Pervasive Computing," Washington University, pp. 1-6 (Sep. 2000).
Halbwachs et al., "The Synchronous Data Flow Programming Language LUSTRE," Proceedings of the IEEE 79(9):1305-1319 (Sep. 1991).
Hammes et al., "Cameron: High Level Language Compilation for Reconfigurable Systems," Proc. of the Intl. Conf. on Parallel Architectures and Compilation Techniques, pp. 236-244 (Oct. 1999).
Hartenstein, "Coarse Grain Reconfigurable Architectures," Design Automation Conference, 2001. Proceedings of the ASP-Dac 2001, Asian and South Pacific Jan. 30, 2001-Februxay 2, 2001, Piscataway, NJ, US, IEEE, pp. 564-569 (Jan. 30, 2001).
Heinz, "An Efficiently Compilable Extension of {M}odula-3 for Problem-Oriented Explicitly Parallel Programming," Proceedings of the Joint Symposium on Parallel Processing (May 1993).
Hinden et al., "The DARPA Internet Interconnecting Heterogeneous Computer Networks with Gateways," IEEE Computer Magazine pp. 38-48 (1983).
Horton, "Beginning Java 2: JDK 1.3 Edition," Wrox Press, Chapter 8, pp. 313-316 (Feb. 2001).
Huff et al., "Lifetime-Sensitive Modulo Scheduling," 6th Conference on Programming Language, Design and Implementation, pp. 258-267, ACM (1993).
IBM, "Multisequencing a Single Instruction Stream Scheduling with Space-time Trade-offs," IBM Technical Disclosure Bulletin 36(2):105-108 (Feb. 1, 1993).
IEEE, "IEEE Standard Verilog Hardware Description Language," downloaded from http://inst.eecs.berkeley.edu/~cs150/fa06/Labs/verilog-ieee.pdf on Dec. 7, 2006 (Sep. 2001).
Internet Wire, Sunbeam Joins Microsoft in University Plug and Play Forum to Establish A "Universal" Smart Appliance Technology Standard (Mar. 23, 2000).
Ishii et al., "Parallel Variable Length Decoding with Inverse Quantization for Software MPEG-2 Decoders," Workshop on Signal Processing Systems, Design and Implementation, IEEE pp. 500-509 (Nov. 3-5, 1997).
Isoworth, "Isoworth Beverage Dispensing Technology Worldwide Company," Brochure (May 22, 2000).
Jain et al., "An Alternative Approach Towards the Design of Control Units," Microelectronics and Reliability 24(6):1009-1012 (1984).
Jain, "Parallel Processing with the TMS320C40 Parallel Digital Signal Processor," Sonitech International Inc., pp. 13-46. Retrieved from: http://www-s.ti.com/sc/psheets/spra031/spra031.pdf retrieved on Apr. 14, 2004 (Feb. 1994).
Janssen et al., "Partitioned Register File for TTAs," Proceedings of the 28th Annual International Symposium on Microarchitecture, pp. 303-312 (Nov. 1995).
Jong-Pyng et al., "Real-Time Virtual Channel Flow Control," Proceedings of the Annual International Phoenix Conference on Computers and Communications, Conf. 13, pp. 97-103 (Apr. 12, 1994).
Jung et al., "Efficient Hardware Controller Synthesis for Synchronous Dataflow Graph in System Level Design," Proceedings of the 13th International Symposium on System Synthesis pp. 79-84 (ISSS'00) (Sep. 2000).
Kaufmann et al., "Digital Spread-Spectrum Multipath-Diversity Receiver for Indoor Communication," from Pioneers to the 21st Century; Denver, Proceedings of the Vehicular Technology Socity [sic] Conference, NY, IEEE, US 2(Conf. 42):1038-1041 (May 10-13, 1992).
Kneip et al., "An Algorithm Adapted Autonomous Controlling Concept for a Parallel Single-Chip Digital Signal Processor," Journal of VLSI Signal Processing Systems for Signal, Image, an dVideo Technology 16(1):31-40 (May 1, 1997).
Lee & Messerschiviitt, "Pipeline Interleaved Programmable DSP's: Synchronous Data Flow Programming," IEEE Transactions on Acoustics, Speech, and Signal Processing ASSP-35(9):1334-1345 (Sep. 1987).
Lee & Messerschiviitt, "Synchronous Data Flow," Proceedings of the IEEE 75(9):1235-1245 (Sep. 1987).
Lee & Parks, "Dataflow Process Networks," Proceedings of the IEEE 83(5):773-799 (May 1995).
Liu et al., "Scheduling Algorithms for Multiprogramming in a Hard-Real-Time Environment," *Journal of the Association for Computing* 20(1):46-61 (1973).
Llosa et al., "Lifelime-Sensitive Modulo Scheduling in a Production Environment," IEEE Trans. on Comps. 50(3):234-249 (Mar. 2001).
Lu et al., "The Morphosys Dynamically Reconfigurable System-On-Chip," Proceedings of the First NASA/DOD Workshop on Evolvable Hardware, pp. 152-160 (Jul. 19, 1999).
Mangione-Smith et al., "Seeking Solutions in Configurable Computing," *Computer* 30(12):38-43 (Dec. 1997).
Manion, "Network CPU Adds Spice," Electronic Engineering Times, Issue 1126 (Aug. 14, 2000).
Mascia & Ishii., "Neural Net Implementation on Single-Chip Digital Signal Processor," IEEE (1989).
McGraw, "Parallel Functional Programming in Sisal: Fictions, Facts, and Future," Lawrence Livermore National Laboratory pp. 1-40 (Jul. 1993).
Najjar et al., "High-Level Language Abstraction for Reconfigurable Computing," *Computer* 36(8):63-69 (Aug. 2003).
Nichols et al., "Data Management and Control-Flow Constructs in a SIMD/SPMD Parallel Language/Compiler," Proceedings of the 3rd Symposium on the Frontiers of Massively Parallel Computation pp. 397-406 (Oct. 1990).
OpenMP Architecture Review Board, "OpenMP C and C++ Application Program Interface," pp. 7-16 (Oct. 1998).
Oracle Corporation, "Oracle8i JDBC Developer's Guide and Reference," Release 3, 8.1.7, pp. 10-8-10-10 (Jul. 2000).
Pauer et al., "Algorithm Analysis and Mapping Environment for Adaptive Computing Systems: Further Results," Proc. IEEE Symposium on FPGA's for Custom Computing Machines (FCCM), Napa CA (1999).
Pauer et al., "Algorithm Analysis and Mapping Environment for Adaptive Computing Systems," Presentation slides, Third Bi-annual Ptolemy Miniconference (1999).
Ramamritham et al., "On Scheduling Algorithms for Real-Time Multiprocessor Systems," Algorithms and Applications, Proceedings of the International conference on Parallel Processing 3:143-152 (Aug. 8, 1989).
Schneider, "A Parallel/Serial Trade-Off Methodology for Look-Up Table Based Decoders," Proceedings of the Design Automation Conference 34:498-503 (Jun. 9-13, 1997).
Sidhu et al., "A Self-Reconfigurable Gate Array Architecture," 10 International Workshop on Field Programmable Logic and Applications http://coblitz.codeen.org:3125/citeseer.ist.psu.edu/cache/papers/cs/17524/http:zSzzSzmaarcii.usc.
eduzSzPublicationsZSzsidhu_fp100.pdf/
sidhu00selfreconfigurable.pdf retrieved on Jun. 21, 2006 (Sep. 1, 2001).
Smith, "Intro to ASICs: ASIC Cell Libraries," at http://iroi.seu.edu.cn/books/asics/Book2/CH01/CH01.5.htm, printed on Feb. 4, 2005 (Jun. 1997).

Souza, "Computing's New Face—Reconfigurable Devices Could Rattle Supply Chain," Electronic Buyers' News Issue 1205, pg. p. 1 (Apr. 3, 2000).
Souza, "Quicksilver Buys White Eagle," Electronic Buyers News, Issue 1220 (Jul. 17, 2000).
Sriram et al., "MPEG-2 Video Decoding on the TMS320C6X DSP Architecture," Conference Record of the 32nd Asilomar Conference on Signals, Systems, and Computers, IEEE pp. 1735-1739 (Nov. 1-4, 1998).
Steiner, "Coke Chief's Latest Daft Idea—A Cola Tap in Every House," Sunday Times (Mar. 2001).
Sun Microsystems, "Fortran 3.0.1 User's Guide, Revision A," pp. 57-68 (Aug. 1994).
Svensson, "Co's Join On Home Web Wiring Network," Associated Press Online printed on Apr. 30, 2008 (Jun. 2000).
Tang et al., "Thread Partitioning and Scheduling Based on Cost Model," Proceedings of the Ninth Annual ACM Symposium on Parallel Algorithms and Architectures, pp. 272-281 Retrieved from: http://doi.acm.org/10.1145/258492.2585 retrieved on Aug. 25, 2004 (1997).
Vaya, "Viturbo: A Reconfigurable Architecture for Ubiquitous Wireless Networks," A Thesis Submitted in Partial Fulfillment of the Requirements for the Degree Master of Science; Rice University (Aug. 2002).
Wang et al., "Cell Search in W-CDMA," IEEE Journal on Selected Areas in Communications 18(8):1470-1482 (Aug. 2000).
Wardell, "Help for Hurried Cooks?," Popular Science, p. 32 (May 2000).
Whiting & Pascoe, "A History of Data-Flow Languages," IEEE Annals of the History of Computing 16(4):38-59 (1994).
Williamson & Lee, "Synthesis of Parallel Hardware Implementations from Synchronous Dataflow Graph Specifications," Conference Record of the Thirtieth Asilomar Conference on Signals, Systems and Computers 1340-1343 (Nov. 1996).
Wirthlin et al., "A Dynamic Instruction Set Computer," Proceedings of the IEEE Symposium on FPGA's for Custom Computing Machines, pp. 99-107 (Apr. 21, 1995).
WWW.APPLIANCEMAGAZINE.COM, World Wide Web at http://web.archive.org/web/20000511085402/http://www.appliancemagazine.com/ printed on Apr. 30, 2008.
WWW.BESTROM.COM, BreakMateTM from www.bestrom.com printed on Apr. 29, 2008.
WWW.BEVERAGEEXPRESS.COM, Beverage Express from www.beverageexpress.com printed on Apr. 30, 2008.
WWW.BEVSTAR.COM, Isoworth Beverage Dispensing Technology Worldwide from www.bevstar.com printed on Apr. 30, 2008.
WWW.BONATOR.COM, from The World Wide Web at http://web.archive.org/web/20000510102440/http://www.bonatorcom/ printed on Apr. 30, 2008.
WWW.ECOMMERCE.DEWPOINTING.COM, Swiss Mountain Coffees from www.ecommerce.dewpointinc.com printed on Apr. 30, 2008.
WWW.GATEWAY.COM, World Wide Web, http://web.archive.org/web/20000229192734/www.gateway.com/productpages/9300splash/index.shtml Available on Mar. 3, 2000, 1 page (Mar. 3, 2000).
WWW.ICL.COM, from the World Wide Web at http://www.icl.com printed on Apr. 30, 2008.
WWW.MARGHERITA2000.COM; from Margherita2000.com printed Apr. 30, 2008 (Jan. 26, 2001).
WWW.SODACLUBENTERPRISES.COM, Soda-Club Enterprises from www.sodaclubenterprises.com printed on Apr. 30, 2008.
WWW.SYMBOL.COM, Symbol from www.symbol.com printed on Apr. 30, 2008.
WWW.WUNDERBAR.COM, Wunder-Bar Dispensing Systems from www.wunderbar.com printed on Apr. 30, 2008.
World Wide Web, http://web.archive.org/web/20000229192734/www.gateway.com/productpages/9300splash/index.shtml, Gateway.com, available on Mar. 3, 2000, 1 page.*

* cited by examiner

SYSTEM FOR AUTHORIZING FUNCTIONALITY IN ADAPTABLE HARDWARE DEVICES

Matter enclosed in heavy brackets [ ] appears in the original patent but forms no part of this reissue specification; matter printed in italics indicates the additions made by reissue.

CROSS-REFERENCE TO RELATED APPLICATIONS

This application is related to co-pending U.S. patent application Ser. No. 09/815,122, filed on Mar. 22, 2001, entitled "ADAPTIVE INTEGRATED CIRCUITRY WITH HETEROGENEOUS AND ADAPTABLE MATRICES OF DIVERSE AND ADAPTIVE COMPUTATIONAL UNITS HAVING FIXED, APPLICATION SPECIFIC COMPUTATIONAL ELEMENTS" which is hereby incorporated by reference as if set forth in full in this document.

BACKGROUND OF THE INVENTION

This invention relates in general to monitoring functionality in adaptable devices and more specifically to a system for authorizing, in an ongoing manner, users and other entities for activity in association with a highly adaptable hardware device.

Traditional consumer electronic devices have substantially fixed functionality. Devices such as cell phones, digital audio players, personal digital assistants (PDAs), global positioning satellite (GPS) terminals, etc. are designed from scratch and manufactured and marketed as a specific type of device with a specific feature set. Traditionally, once a consumer purchases a hardware device the original manufacturer of the device has no further control over the device and can not receive additional revenue based on a consumer's use of the device. While this approach has worked well for non-adaptable, "fixed function," devices, such an approach suffers from several drawbacks in the case where highly adaptable consumer devices are developed and marketed.

This approach is adequate where a device's functionality is "fixed" or not capable of substantially changing. However, recent developments are providing more flexible consumer devices where the device's feature set, data formats, communication protocols, etc. can be greatly modified after sale by the use of software or other information. Such modification can potentially be so extreme as to change the consumer's concept of the device so that it is no longer even considered to be the same device. Thus, it is desirable to provide a mechanism whereby a manufacturer, or other entity, has more opportunities to obtain revenue and profit from the creation and support of the devices, and associated hardware and software.

SUMMARY OF THE INVENTION

The present invention provides a system for authorizing new or ongoing functional use of an adaptable, or configurable, device. The device generates usage information including the times that the device is used, types of functionality provided, indication of amount and type of resources used, and other information. The usage information is transmitted back to a controlling entity, such as an original manufacturer of the adaptable device. The controlling entity can act to enable or prevent use of the provided functionality, as desired. Part of the requirement for using functionality can be monetary, by predetermined agreement, or by other criteria.

In one embodiment the invention provides a method for authorizing the use of an adaptable device. The method includes detecting that the adaptable device is adapted to perform a first type of operation at a first point in time; detecting that the adaptable device is adapted to perform a second type of operation at a second point in time; and using the detected adaptations to determine whether to authorize the continued use of the device.

DESCRIPTION OF A PREFERRED EMBODIMENT

The present invention allows for monitoring and controlling adaptable devices after the point of sale. Examples of a preferred type of adaptable device is described in the above-referenced co-pending patent application. Although the invention is discussed herein with respect to specific device types, it should be clear that aspects of the invention include any type of adaptable device, using any type of architecture, adaptation method, adaptation information transfer systems, adaptation data format, etc.

Figure 1:
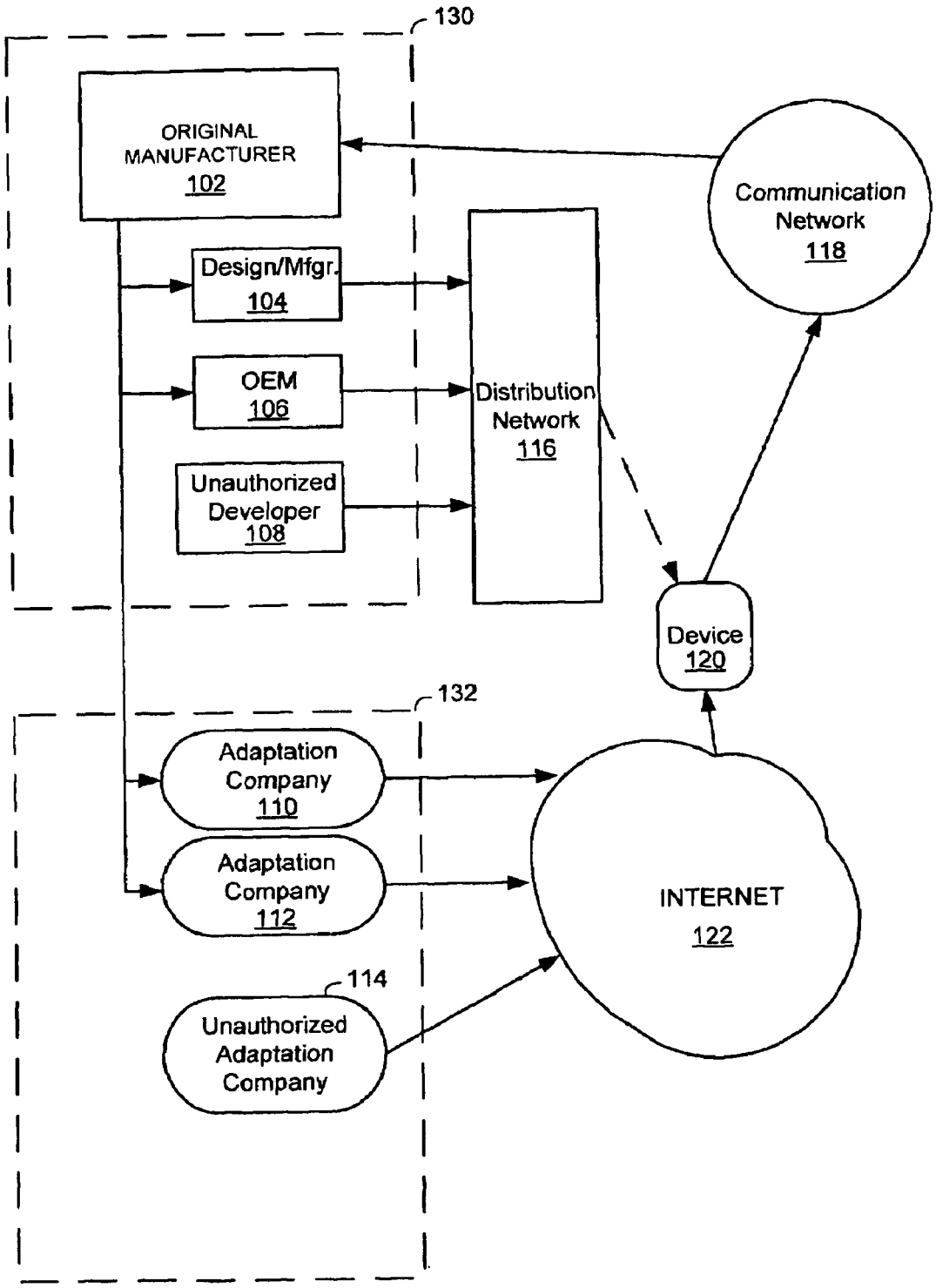
FIG. 1 illustrates typical entities involved in the development, sale, distribution and adaptation of a adaptable device.

FIG. 1 illustrates typical entities involved in the development, sale, distribution and adaptation of a adaptable device.

In FIG. 1, box 130 illustrates entities involved with hardware aspects of the device while box 132 illustrates entities involved with software, or "adaptation information," aspects of the device. Original manufacturer 102 is the primary developer of the adaptable device. As such, original manufacturer 102 desires to obtain as much revenue as possible from all entities who stand to gain, or benefit from, use and sale of the device or of additional hardware and information related to the device. Note that although the system of the present invention is discussed primarily with respect to obtaining revenue and profits for the original manufacturer, that any entity in FIG. 1 (and other entities, not shown) can obtain revenue benefits using features of the present invention.

Original manufacturer 102 can sell, rent, lease, license or otherwise deliver, device 120 to an end user. A preferred embodiment of the invention licenses the use of the hardware device, or resources in the hardware device. Such licensing can be by possession of the device over time, dependent on machine cycles, features used, input/output (I/O) rate or amount, memory activity or utilization, energy use, bus utilization, or any other performance measurement. This ability of the original manufacturer to receive one or more payments after sale of the device, where the payments are dependent upon a degree of possession or use of the device, provides distinct commercial advantages to one or more entities involved, including the end user.

Returning to FIG. 1, delivery of the physical adaptable device can be through normal retail distribution networks such as store sales, internet sales, mail order, telephone order, etc, as represented by distribution network 116. Original manufacturer 102 can license or sell components or hardware technology to designer 104 or original equipment manufacturer (OEM) 106, or other entities (not shown). The commercial aspects of selling or licensing hardware to end users, or to affiliated developers or business partners is well-known and any traditional, or future, development, sales, and distribution methods can be employed.

Unauthorized developer 108 is a hardware manufacturer that operates without authority from original developer 102. However, because the device (or components) are physical, such unauthorized action is relatively easy to detect and police by using traditional laws and regulation methods.

Box 132 represents the "software" aspect of the adaptable device. As mentioned, device 120 is so highly adaptable that it can be readapted not only with extremely diverse features, but it can also be readapted to become a completely different functional device. For example, formats can be changed so that a device adapted as a code division multiple access (CDMA) cell phone can become a time-division multiple access (TDMA) cell phone by downloading adaptation information from adaptation companies such as 110 or 112 through a communications link such as internet 122. Other formats and/or protocols are possible such as voice over internet protocol (VoIP), traditional radio frequency transmission, etc. The device itself can be changed so that it is no longer a cell phone, but becomes a different device, or combination of what are today considered different devices. For example, the device can be readapted to be a media playback device, database device, web browser, digital satellite radio, etc.

Within a given device type there may be multiple formats, protocols, or other data or transmission type differentiations that make device types incompatible with each other or with certain data. For example, audio media players may be mp3, RealAudio, Media Player, .wav or other formats. Digital video players may include MPEG, .mov, .avi, and other formats. A highly adaptable device is able to perform functions so that the same physical device can be adapted to be any device type, and to handle any function or operation among different data and transmission formats within a device type. The physical device type can be a hand-held unit, set top box, car mounted, etc.

Adaptation companies 110 and 112 can receive payment from an end user of device 120 by means as is known in the art. For example, the adaptation information can be downloaded as shareware, trialware, a standard software product, etc. The adaptation information can also be licensed. Alternatively, payments to the adaptation companies can come from original manufacturer 102 while the original manufacturer obtains revenue with one of the approaches described, below.

Unauthorized adaptation company 114 represents an entity producing adaptation information without approval (or not under the control of) original manufacturer 102. Such unauthorized software-type distribution is extremely difficult to police and control because of the amorphous, complex and world-wide nature of Internet 122, typically used as the distribution mechanism.

However, a preferred embodiment of the invention allows the original manufacturer to receive revenue from any use of the device regardless of whether an authorized, or unauthorized, adaptation company has sold a "virtual device" (i.e., adaptation information that defines a new feature or device) to an end user. The preferred embodiment allows the device to send "usage information" from device 120 to original manufacturer 102 via communication network 118. Communication network 118 can be any type of network such as the Internet, satellite, radio-frequency broadcasts, the cellular network, a cable network, POTS telephone network, etc. The types of usage information are next presented.

Device 120 can be any type of adaptable device created using any type of architecture or design methodology, such as a device using a general-purpose processor, multiprocessing, application-specific integrated circuit (ASIC), field-programmable gate array (FPGA), dedicated circuitry, etc., or combination of the foregoing. A preferred embodiment of the invention uses an adaptive computing engine (ACE) which is more fully described in the co-pending patent application referenced above. For purposes of illustration, the features of the present invention are next presented with respect to two specific architectures, namely (1) a general-purpose processor architecture and (2) the ACE architecture. However, it should be apparent that any type of adaptable hardware device design is adaptable for use with the present invention.

Figure 2:
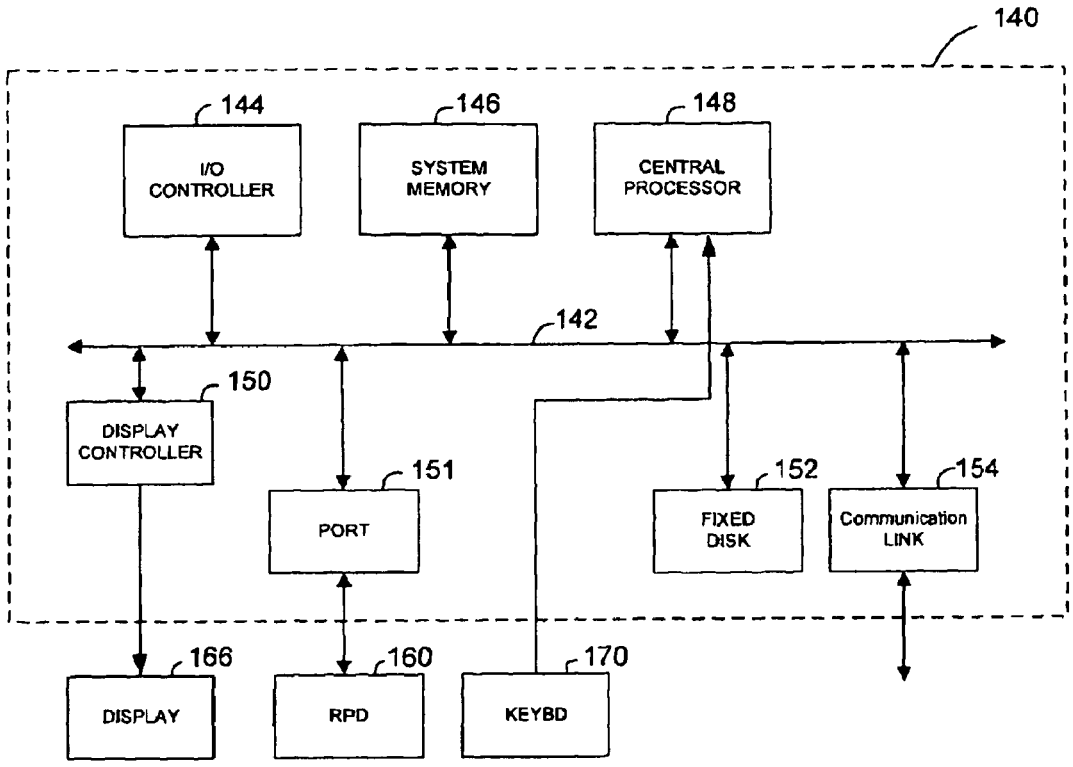
FIG. 2 illustrates a general-purpose processor type of adaptable device.

FIG. 2 illustrates a general-purpose processor type of adaptable device.

In FIG. 2, subsystems within device 140 typically communicate over a system bus such as bus 142. Additional buses or data transfer links can be used, such as dedicated signal wires, etc. Subsystems include input/output (I/O) controller 144, System Memory (or random access memory "RAM") 146, central processing unit CPU 148, Display Controller 150, Serial Port 150, Fixed Disk 152, and Communication Link 154. Communication Link 154 allows the device to transfer data with an arbitrary external device, network or other communication system such as the Internet. Typically, adaptation information in the form of software can be loaded into the device through the communication link. Other ways to reconfigure the device include using removable media such as magnetic disks, compact disk read-only memory (CDROM), media cards, etc.

Bus 142 allows each of the subsystems to transfer data among other subsystems and, most importantly, with the CPU. External devices can communicate with the CPU or other subsystems via bus 142 by interfacing with a subsystem on the bus. Thus, Display 166 communicates with Display Adapter 150, a relative pointing device (RPD, e.g. a mouse) connects through Port 160, etc. Some devices such as Keyboard 170 can communicate with the CPU by direct means without using the main data bus as, for example, via an interrupt controller and associated registers (not shown). Any manner of user controls can be employed.

The present invention allows monitoring of various performance aspects, resource utilization and other indicators of use of the adaptable device. Any information, used to indicate the extent or type of use of an adaptable device is referred to herein as "usage information" or "usage parameters".

One type of usage information includes using identification tags. An identification tag is an electronic signal sent via the communication link to the original manufacturer or another entity for purposes of monitoring usage. Each tag can be a unique identifier to indicate a type of functionality, feature, type of device adaptation, or other indication of usability of the device. In a preferred embodiment, the tags and a device identification are received by an authorizing entity. The device must receive an authorization code from the authorization entity before using, or in order to continue to use, the type of function indicated by the tag. Such authorization can be sent periodically to continue allowing the device to perform the functionality. Authorization can be based on a payment schedule, purchaser agreement, or some other criteria.

Other types of usage information measure performance or resource utilization of the device. For example, processor speed, number of cycles, or clock "on" time can be measured.

This is not only an indication of how long the device is on, or being used, but also can indicate how much processing the device is performing.

Since many cycles are "idle" in a typical processor, other operations such as rate of instruction execution and type of instructions executed can be detected. For example, one approach is to sample the processing occurring at relatively long intervals, such as once per 500 mS. If digital signal processing (DSP) is occurring frequently then a higher charge can be applied to the device owner's account because DSP processing is a likely indicator of a high-level device operation. A high-level device such as a cell phone, media playback device, etc., would use DSP operations more frequently as opposed to standard logic and arithmetic functions in more basic devices such as an address book or web browser. A counter can be integrated into the central processing unit to increment when a complex (or other predetermined) instruction is executed. The counter value can be sampled at intervals.

Use of system resources is another type of usage information, or usage parameter, that can be the basis for payment charges, user accounting, monitoring or other purposes. For example, the rate of memory accessing, average or maximum memory utilization, I/O use by one or more ports, buses, communication links, etc., can be measured and used as usage information. As is discussed next, the preferred architecture (as opposed to a general purpose processor approach) allows more precise determination of usage information based on minute functionality or performance of an adaptable device.

Authorization codes can be keyed to enable only specific devices. Such an approach can use keyed encryption schemes, or other methods, as is known in the art. Authorization can be used to allow the user to use the device, or a portion of the device's functionality, for a period of time. Authorized use can be measured in other ways as, for example, by providing limitations on resources such as processing time, memory use, number or type of instruction or operations allowed, or any other type of device resource.

Figure 3:
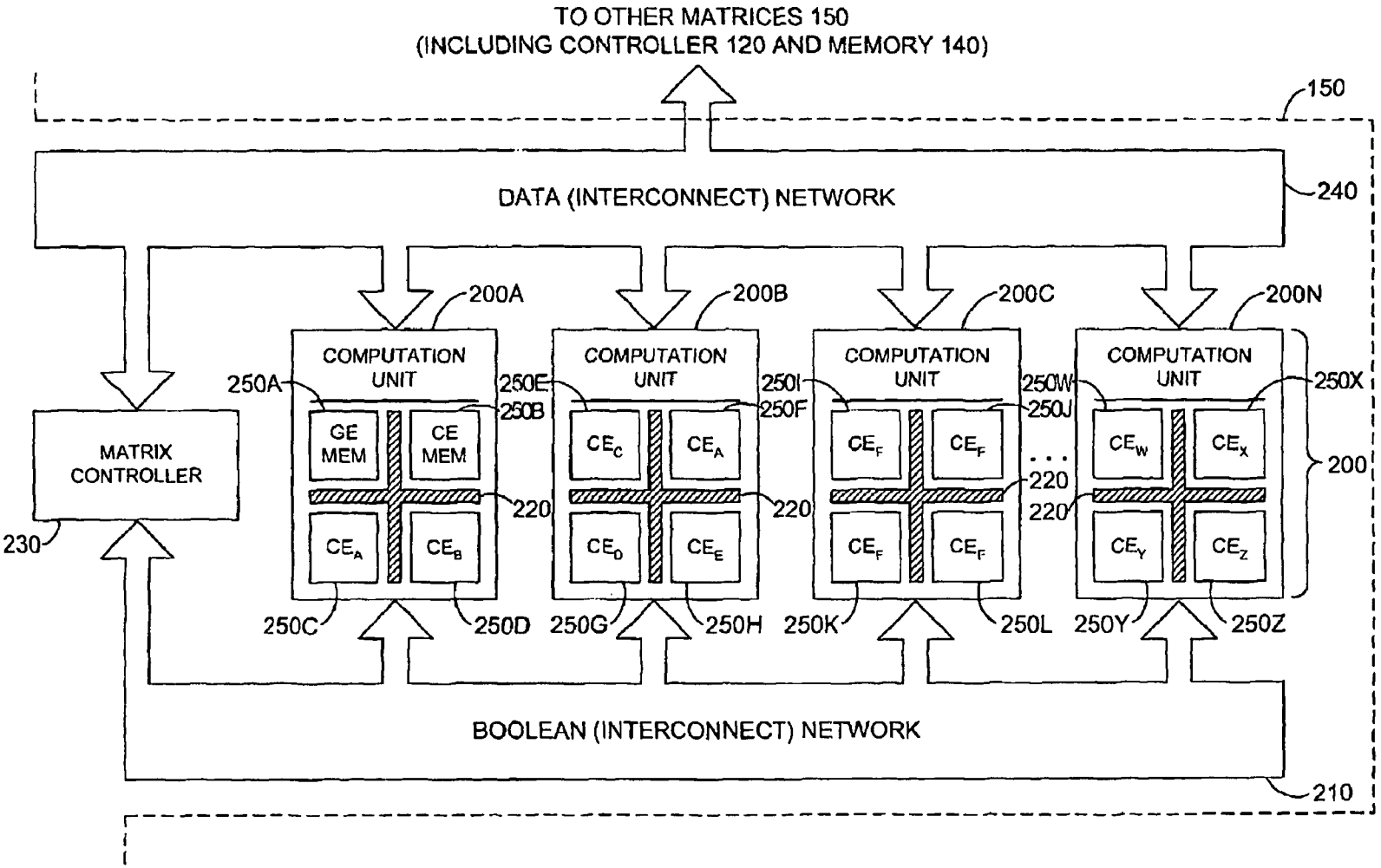
FIG. 3 illustrates basic parts of an adaptable device architecture based on an adaptive computing environment.

FIG. 3 illustrates basic parts of an adaptable device architecture based on an adaptive computing environment (ACE) approach. Such an approach is discussed in detail in the co-pending patent application referenced, above. The ACE architecture uses small processing elements called nodes, or matrices. The matrices are each designed to be specialized in one basic type of processing such as arithmetic, bit manipulation, finite state machine, memory oriented or reduced instruction set computing (RISC) approaches. The matrices are provided with adaptable interconnection networks. A scheduler performs the task of mapping an operation, or function, onto the matrices. Once mapped, the function can execute for a while before a next function is mapped onto the same set of matrices. In this manner, the functionality of a device that includes the matrices can be changed quickly and efficiently.

In FIG. 3, adaptable matrix 150 includes a plurality of computation units 200 (illustrated as computation units 200A through 200N). Computation units include a plurality of computational elements 250 (illustrated as computational elements 250A through 250Z). As illustrated in FIG. 3, matrix 150 generally includes a matrix controller 230 and plurality of computation (or computational) units 200 as logical or conceptual subsets or portions of a matrix interconnect network. Also shown are data interconnect network 240 and Boolean interconnect network 210. Interconnect networks can have different levels of interconnectivity and flexibility for greater levels of adaptability and adaptation. In an applied architecture, the matrix represented by FIG. 3 is replicated within a single chip, or chipset, and interconnected with each other to provide a scalable approach to providing processing resources. A network interconnecting matrices (not shown) is referred to as a matrix interconnection network.

Boolean interconnect network 210 provides adaptation and data interconnection capability between and among the various computation units 200, and is preferably small (i.e., only a few bits wide). Data interconnect network 240 provides the adaptation and data interconnection capability for data input and output between and among the various computation units 200, and is preferably comparatively large (i.e., many bits wide). It should be noted, however, that while conceptually divided into adaptation and data capabilities, any given physical portion of the matrix interconnection network, at any given time, may be operating as either the Boolean interconnect network 210, the data interconnect network 240, the lowest level interconnect 220 (between and among the various computational elements 250), or other input, output, or connection functionality.

Continuing to refer to FIG. 3, included within a computation unit 200 are a plurality of computational elements 250, illustrated as computational elements 250A through 250Z (individually and collectively referred to as computational elements 250), and additional interconnect 220. The interconnect 220 provides the adaptable interconnection capability and input/output paths between and among the various computational elements 250. As indicated above, each of the various computational elements 250 consist of dedicated, application specific hardware designed to perform a given task or range of tasks, resulting in a plurality of different, fixed computational elements 250. Utilizing the interconnect 220, the fixed computational elements 250 may be adaptably connected together into adaptive and varied computational units 200, which also may be further readapted and interconnected, to execute an algorithm or other function, at any given time, utilizing the interconnect 220, the Boolean network 210, and the matrix interconnection network (not shown).

In a preferred embodiment, the various computational elements 250 are designed and grouped together, into various adaptive and adaptable computation units 200. In addition to computational elements 250 which are designed to execute a particular It algorithm or function, such as multiplication or addition, other types of computational elements 250 are also utilized. As illustrated in FIG. 3, computational elements 250A and 250B implement memory, to provide local memory elements for any given calculation or processing function (compared to more "remote" or auxiliary memory that can be external to the matrix). In addition, computational elements 250I, 250J, 250K and 250L are adapted to implement finite state machines to provide local processing capability especially suitable for complicated control processing.

With the various types of different computational elements 250 that may be available, depending upon the desired functionality, the computation units 200 may be loosely categorized. A first category of computation units 200 includes computational elements 250 performing linear operations, such as multiplication, addition, finite impulse response filtering, and so on. A second category of computation units 200 includes computational elements 250 performing non-linear operations, such as discrete cosine transformation, trigonometric calculations, and complex multiplications. A third type of computation unit 200 implements a finite state machine, such as computation unit 200C as illustrated in FIG. 3, particularly useful for complicated control sequences, dynamic scheduling, and input/output management, while a fourth type may implement memory and memory management, such as computation unit 200A. Lastly, a fifth type of computation unit 200 may be included to perform bit-level manipulation, such as for encryption, decryption, channel coding, Viterbi decoding, and packet and protocol processing (such as Internet Protocol processing).

In addition to the ways of determining functionality for general-purpose processing devices, as described above, the functionality of a device using the ACE architecture can be determined by adaptation information that is used to schedule operations on the computation units. Usage information can include the availability, types and frequency of use of different computation units. Adaptation of the interconnect network, number of active computation units over time, rate of execution of operations, etc., can all be used as usage parameters.

Although the invention has been described with respect to specific embodiments, the embodiments are merely illustrative, and not restrictive, of the invention. For example, the specific adaptable device designs presented herein can be greatly modified without departing from the scope of the invention. Subsystems, components or devices other than those shown can be added, modified or removed from the designs. Similarly, entities can be added to, or removed from the diagram of FIG. 1, depicting the operation and method of the present invention. In general, the advantages of the present invention can be realized with many different types of entities playing different roles and having different relationships to each other than those shown in FIG. 1.

Note that traditional forms of selling, renting, leasing, or contractual or licensing arrangements for the use of adaptable devices are possible. Such traditional terms can incorporate the approach of the present invention to monitor usage information and to authorize functionality, use of resources, etc.

Thus, the scope of the invention is to be determined solely by the appended claims.

What is claimed is:

[1. A method for authorizing the use of a configurable device, the method comprising:

detecting that the configurable device is configured to perform a first type of operation at a first point in time;

detecting that the configurable device is configured to perform a second type of operation at a second point in time;

using the detected configurations to determine whether to authorize the continued use of the device, wherein the detecting steps include the substep of receiving usage information from the device;

wherein the usage information includes information about resources that the device has used, and wherein a resource includes instruction type.]

[2. A method for authorizing the use of a configurable device, the method comprising:

detecting that the configurable device is configured to perform a first type of operation at a first point in time;

detecting that the configurable device is configured to perform a second type of operation at a second point in time;

using the detected configurations to determine whether to authorize the continued use of the device, wherein the detecting steps include the substep of receiving usage information from the device;

wherein the usage information includes information about resources that the device has used, and wherein a resource includes instruction execution frequency.]

*3. A method for authorizing the use of a configurable device, the method comprising:*

*detecting that the configurable device is configured to perform a first type of operation at a first point in time;*

*detecting that the configurable device is configured to perform a second type of operation at a second point in time;*

*using the detected configurations to determine whether to authorize the continued use of the device, wherein the detecting steps include the substep of receiving usage information from the device;*

*wherein the usage information includes information about resources that the device has used, and*

*wherein a resource includes instruction type.*

*4. A method for authorizing the use of a configurable device, the method comprising:*

*detecting that the configurable device is configured to perform a first type of operation at a first point in time;*

*detecting that the configurable device is configured to perform a second type of operation at a second point in time;*

*using the detected configurations to determine whether to authorize the continued use of the device, wherein the detecting steps include the substep of receiving usage information from the device;*

*wherein the usage information includes information about resources that the device has used, and wherein a resource includes instruction execution frequency.*

*5. A system for authorizing the use of configurable devices, the system comprising:*

*an authorization system; and*

*a communications link to transfer adaptation information from the authorization system to a configurable device including a plurality of heterogeneous computational elements coupled to a configurable interconnection network, the configurable interconnection network being configured in response to the adaptation information to provide corresponding interconnections between the plurality of heterogeneous computational elements to configure the device to perform a function,*

*wherein the configurable device transmits usage information regarding the use of the function,*

*wherein the usage information comprises a device identification that is transmitted to the authorization system over the communications link, and wherein the authorization system transmits an authorization code over the communications link to the configurable device,*

*wherein the authorization code provides limitations on resources of the configurable device used by the function.*

*6. The system of claim 5, wherein the authorization system determines whether the configurable device is authorized to perform the function based on the usage information; and prevents the configurable device from performing the function if it is determined that the configurable device is not authorized to perform the function.*

*7. The system of claim 5, wherein the plurality of computational elements are hardware computational elements and the interconnections are physical interconnections.*

*8. The system of claim 5, wherein:*

*the function is a new function and the configurable device was previously configured to perform a previous function; and*

*the configuring of the configurable device comprises reconfiguring the configurable device to perform the new function instead of the previous function in response to the adaptation information.*

*9. The system of claim 8, wherein the previous and new functions comprise different communication or data processing functions.*

*10. The system of claim 8, wherein the previous and new functions comprise different communication functions using different communication protocols.*

*11. The system of claim 10, wherein the different communication functions comprise CDMA and TDMA functions.*

*12. The system of claim 8, wherein the previous and new functions comprise different data processing functions using different data formats.*

*13. The system of claim 8, wherein the previous and new functions comprise media playback functions for different media formats.*

*14. The system of claim 5, wherein the configurable device is a handheld device.*

*15. The system of claim 5, wherein the adaptation information is encrypted and wherein the authorization code is used by the configurable device to decrypt the adaptation information.*

*16. The system of claim 5, wherein the plurality of heterogeneous computational elements coupled to the configurable interconnection network are a node, and wherein the configurable device comprises a plurality of nodes coupled to a node interconnection network.*

*17. The system of claim 16, wherein the node interconnection network is further configured in response to the adaptation information to provide corresponding interconnections between the plurality of nodes to configure the device to perform the function.*

*18. A configurable device comprising:*

*a plurality of computational units, the plurality of computational units including at least a first computational unit configured to perform a linear operation, a second computational unit configured to perform a non-linear operation, a third computational unit configured to perform memory management, and a fourth computational unit configured to perform bit-level manipulation; and*

*a communication network interface configured to transmit an identification tag to an external entity and receive an authorization code allowing use of at least a portion of the configurable device for a period of time,*

*wherein the communication network interface is further configured to receive adaptation information that enables the configurable device to perform a function, and wherein the fourth computational element is configured to decrypt the adaptation information based on the authorization code,*

*wherein the authorization code provides limitations on resources of the configurable device used by the function.*

*19. The configurable device of claim 18, wherein the first computational element is configured to perform an operation selected from the group consisting of multiplication, addition and finite impulse response filtering.*

*20. The configurable device of claim 18, wherein the second computational element is configured to perform an operation selected from the group consisting of discrete cosine transformation, trigonometric calculations and complex multiplication.*

*21. The configurable device of claim 18, wherein the fourth computational element is configured to perform an operation selected from the group consisting of encryption, decryption, channel coding, Viterbi decoding and packet and protocol processing.*

*22. The configurable device of claim 18, wherein the communication network interface is further configured to transmit usage information, wherein the usage information comprises a device identification and wherein the authorization code is associated with the device identification.*

*23. The configurable device of claim 18, wherein the first computational element is configured to perform an operation selected from the group consisting of multiplication, addition and finite impulse response filtering, the second computational element is configured to perform an operation selected from the group consisting of discrete cosine transformation, trigonometric calculations and complex multiplication, and the fourth computational element is configured to perform an operation selected from the group consisting of encryption, decryption, channel coding, Viterbi decoding and packet and protocol processing.*

* * * * *